United States Patent
Wang et al.

(10) Patent No.: US 9,334,948 B2
(45) Date of Patent: May 10, 2016

(54) SPLIT ELECTRONIC TRANSMISSION RANGE SELECTION SYSTEMS AND METHODS WITH ELECTRONIC BUTTON SHIFTER

(71) Applicant: GM Global Technology Operations LLC, Detroit, MI (US)

(72) Inventors: Orson S. Wang, Novi, MI (US); David R. Worpell, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 14/088,738

(22) Filed: Nov. 25, 2013

(65) Prior Publication Data
US 2015/0107392 A1 Apr. 23, 2015

Related U.S. Application Data

(60) Provisional application No. 61/894,223, filed on Oct. 22, 2013.

(51) Int. Cl.
| | |
|---|---|
| *F16H 61/12* | (2010.01) |
| *F16H 59/08* | (2006.01) |
| *F16H 61/02* | (2006.01) |
| *F16H 59/10* | (2006.01) |

(52) U.S. Cl.
CPC .............. *F16H 59/08* (2013.01); *F16H 59/105* (2013.01); *F16H 61/0204* (2013.01); *F16H 61/12* (2013.01); *Y10T 74/2003* (2015.01)

(58) Field of Classification Search
None
See application file for complete search history.

(56) References Cited

U.S. PATENT DOCUMENTS

| | | | |
|---|---|---|---|
| 4,025,007 A | 5/1977 | Kaniut | |
| 4,794,820 A | 1/1989 | Floeter | |
| 5,014,038 A * | 5/1991 | Leigh-Monstevens | B60R 25/003 |
| | | | 180/287 |
| 5,042,133 A | 8/1991 | Peterson et al. | |
| 5,908,460 A | 6/1999 | Amisano et al. | |
| 5,974,351 A | 10/1999 | Croft et al. | |
| 6,151,978 A | 11/2000 | Huber | |
| 6,196,078 B1 | 3/2001 | DeJonge et al. | |
| 7,301,478 B1 | 11/2007 | Chinn et al. | |
| 7,490,528 B2 | 2/2009 | Koski et al. | |
| 7,885,746 B2 | 2/2011 | Krishnan et al. | |
| 8,155,847 B2 | 4/2012 | Wang | |
| 8,622,160 B2 | 1/2014 | Flowers | |
| 2004/0249541 A1 | 12/2004 | Kim | |
| 2006/0054366 A1 | 3/2006 | Priepke | |

(Continued)

OTHER PUBLICATIONS

U.S. Appl. No. 13/788,488, filed Mar. 7, 2013, Orson S. Wang et al.

*Primary Examiner* — Justin Holmes

(57) ABSTRACT

A system for selecting a transmission range in a vehicle includes a plurality of range selection buttons configured to individually select corresponding ones of a plurality of ranges. A plurality of sensing circuits are configured to generate sense signals based on positions of corresponding ones of the plurality of range selection buttons. A park range selection button is configured to select a park range. A park sensing circuit is configured to generate sense signals based on a position of the park range selection button. A button state module is configured to output state signals corresponding to the plurality of range selection buttons based on the sense signals from the plurality of sensing circuits. A control module is configured to select a range based on the sense signals from the park sensing circuit and the state signals from the button state module.

19 Claims, 8 Drawing Sheets

(56) References Cited

U.S. PATENT DOCUMENTS

| | | |
|---|---|---|
| 2006/0179962 A1 | 8/2006 | Katrak et al. |
| 2006/0229789 A1 | 10/2006 | Krishnan et al. |
| 2007/0191182 A1 | 8/2007 | Koski et al. |
| 2008/0064559 A1 | 3/2008 | Cawthorne et al. |
| 2008/0128252 A1* | 6/2008 | Meyer ............... F16H 9/12 200/5 A |
| 2009/0233765 A1 | 9/2009 | Tao et al. |
| 2010/0206118 A1* | 8/2010 | Nagashima ............ F16H 1/18 74/473.18 |
| 2012/0095657 A1* | 4/2012 | Pudvay ............... F16H 9/12 701/53 |

* cited by examiner

SPLIT ELECTRONIC TRANSMISSION RANGE SELECTION SYSTEMS AND METHODS WITH ELECTRONIC BUTTON SHIFTER

CROSS-REFERENCE TO RELATED APPLICATIONS

This application claims the benefit of U.S. Provisional Application No. 61/894,223, filed on Oct. 22, 2013. The disclosure of the above application is incorporated herein by reference in its entirety.

This application is related to U.S. patent application Ser. No. 13/788,448 filed on Mar. 7, 2013. The entire disclosure of the above application is incorporated herein by reference.

FIELD

The present disclosure relates to electronic transmission control and more particularly to range selection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, an electronic transmission range selection system is illustrated. Transmission range selection involves selecting a transmission gear range such as park, reverse, neutral, drive, low, or overdrive in a vehicle 100. The vehicle 100 typically includes a shifter assembly 112 that is manipulated by the driver to select a gear range.

The shifter assembly 112 may include one or more sensors to determine a position of a driver input device, which may include, for example, a lever or paddle. Readings from one or more sensors may be transmitted to a shifter interpretation module (SIM) 110. The SIM 110 interprets the sensor readings and determines the range selected by the driver. Based on the selected range, the SIM 110 may transmit a range request to an engine control module (ECM) 104 and a transmission control module (TCM) 106.

The ECM 104 receives inputs from one or more sensors and controls one or more operating parameters of the engine 102. The TCM 106 may receive the range request in different ways. For example, the TCM 106 may receive the range request by direct connection or via a vehicle communication network. The TCM 106 uses the range request to control a transmission 108.

SUMMARY

A system for selecting a transmission range in a vehicle includes a plurality of range selection buttons configured to individually select corresponding ones of a plurality of ranges. A plurality of sensing circuits are configured to generate sense signals based on positions of corresponding ones of the plurality of range selection buttons. A park range selection button is configured to select a park range. A park sensing circuit is configured to generate sense signals based on a position of the park range selection button. A button state module is configured to output state signals corresponding to the plurality of range selection buttons based on the sense signals from the plurality of sensing circuits. A control module is configured to select a range based on the sense signals from the park sensing circuit and the state signals from the button state module.

A method for selecting a transmission range in a vehicle includes individually selecting corresponding ones of a plurality of ranges using a plurality of range selection buttons; generating sense signals based on positions of corresponding ones of the plurality of range selection buttons; selecting a park range using a park range selection button; generating park sense signals based on a position of the park range selection button; generating state signals corresponding to the plurality of range selection buttons based on the sense signals; and selecting a transmission range based on the park sense signals and the state signals corresponding to the plurality of range selection buttons.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An electronic transmission range selection system is used in a vehicle to enable a user of the vehicle to select a transmission gear range, such as park, neutral, reverse, low, drive or manual modes. According to the present disclosure, the driver of the vehicle may select the transmission gear range using individual buttons that individually select park, neutral, reverse, drive or manual range modes. A sensing circuit is used to detect actuation of the park button. Other sensing circuits and a button state module are used to sense states of the buttons other than the park button. The output of the button state module and sensing circuits associated with the park button are used to generate a range request for the transmission.

For example, the output of the button state module and the output of the sensing circuits associated with the park button may be translated into a range request by a control module, such as an engine control module (ECM) or a transmission control module (TCM). Alternately, another vehicle control module may be used to translate the output of the button state module and the output of the sensing circuits associated with the park button into a range request.

The ECM controls the engine and may adjust one or more engine operating parameters based on the range request. The TCM may control a transmission based on the range request. However, if a fault is diagnosed in the button associated with park, the transmission may be maintained in park by default. This feature may make it difficult for the driver to bring the car to a dealer for service.

According to the present disclosure, the driver selects one of park, neutral, reverse, drive or manual modes using the corresponding buttons. Outputs of the sensing circuits corresponding to the park button are directly connected to the control module making the transmission range decision (such as the ECM, TCM or other module). The sensing circuits corresponding to the remaining buttons are input to the button state module. An output of the button state module is then connected to the control module making the transmission range decision (such as the ECM, TCM or other module).

More specifically, the range request may be set to park by default when there is a fault in the park button or the sensing circuit associated with the park button. Even when a fault is diagnosed in this manner, the range request can still be generated reliably based on the sensing circuits corresponding to the remaining buttons and the button state module. This approach allows a driver to operate the vehicle in reverse, neutral, manual and drive despite the presence of a fault in the park button or sensing circuit associated with the park button.

Figure 1:
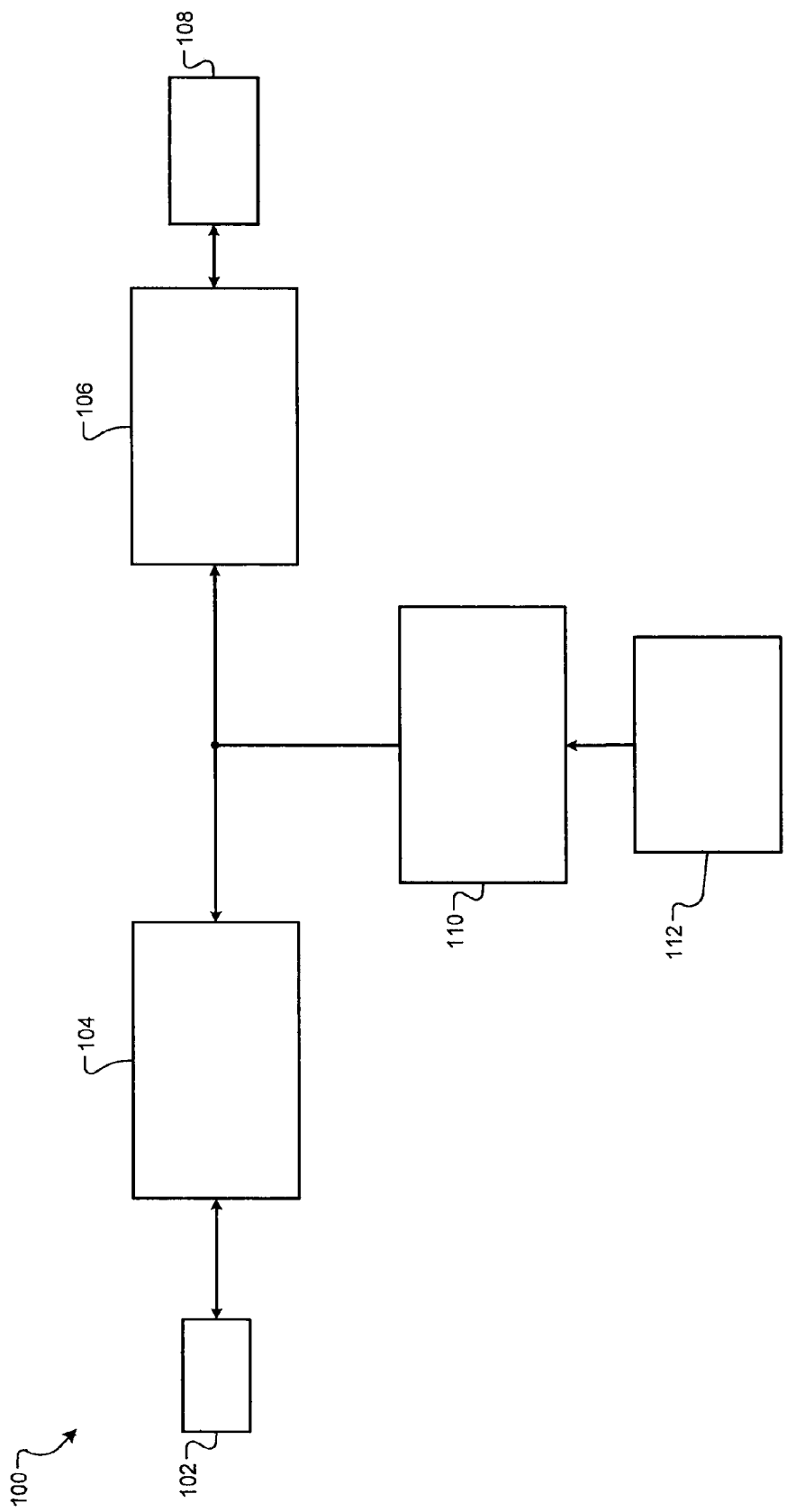
FIG. 1 is a functional block diagram of an example electronic transmission range selection system according to the prior art.
Figure 2A:
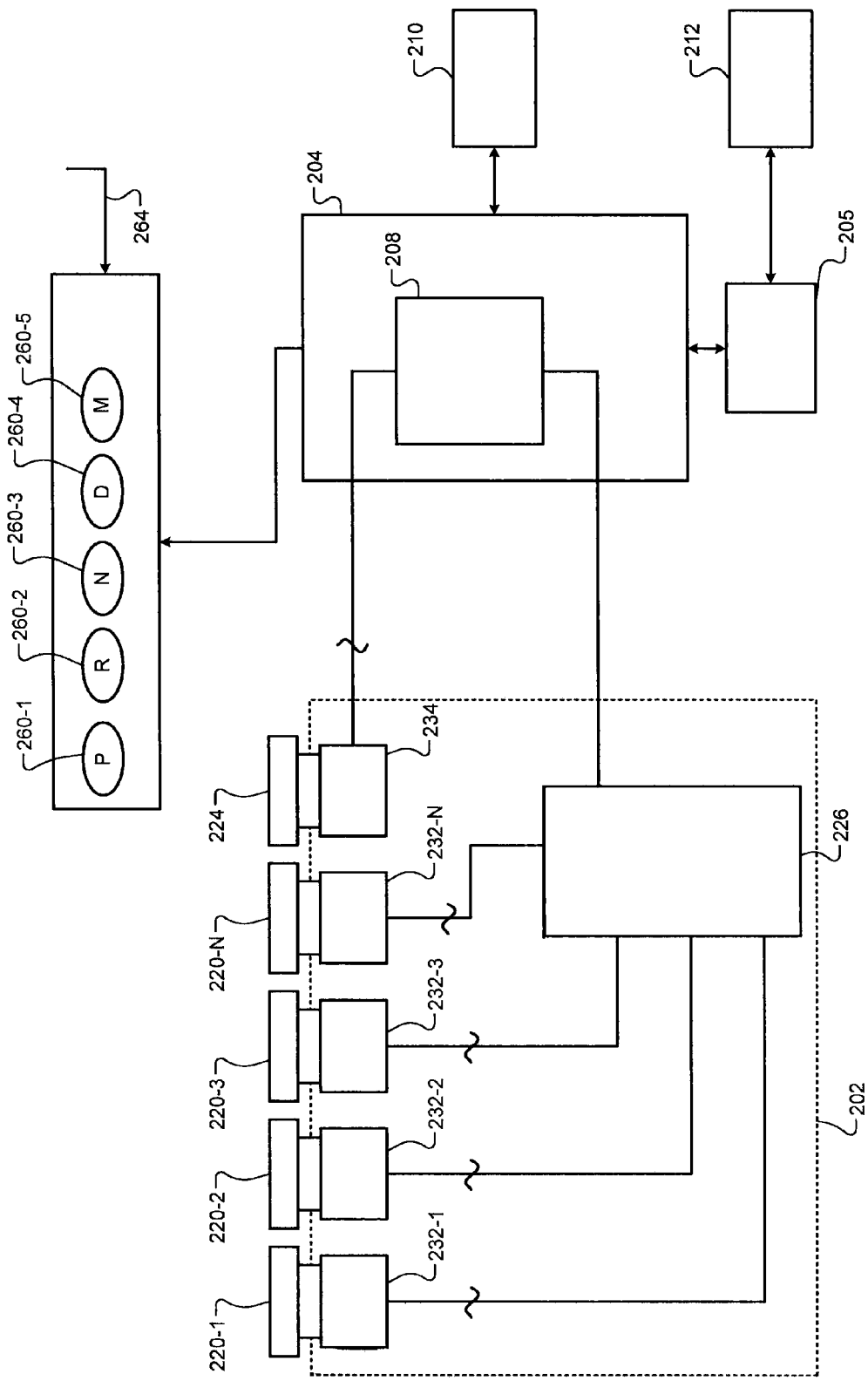
FIG. 2A is a functional block diagram of an example of an electronic transmission range selection system according to the present disclosure.

Referring now to FIG. 2A, a functional block diagram of an example electronic transmission range selection system is presented. A range sensing module 202 is connected to a control module, such as an engine control module (ECM) 204 (as shown in FIG. 2A), a transmission control module (TCM) 205, or any other suitable control module associated with the vehicle. The ECM 204 controls and adjusts operating parameters of an engine 210 and the TCM 205 controls and adjusts operating parameters of a transmission 212. As can be appreciated, the ECM 204 and the TCM 205 may be combined.

In some implementations, the range sensing module 202 may be directly connected to the ECM 204, the TCM 205 or other control module in two or more ways using any suitable connections, such as vehicle networks, direct wire connections, or wireless connections. For example only, the network connections may be made with a network such as a controller area network (CAN) or local interconnect network (LIN).

The range sensing module 202 includes a plurality of range selection buttons 220-1, 220-2, 220-3, . . . , and 220-N (collectively range selection buttons 220), where N is an integer greater than one, and a park selection button 224. For example, the range selection buttons 220 may include individual buttons corresponding to reverse, neutral, drive or manual range modes, although other range selections may be provided. The park selection button 224 is used to select park.

The range selection buttons 220-1, 220-2, 220-3, . . . , and 220-N are connected by sensing circuits 232-1, 232-2, 232-3, . . . , and 232-N to a button state module 226. The sensing circuits 232-1, 232-2, 232-3, . . . , and 232-N (collectively sensing circuits 232) generate one or more signals based on a state of a corresponding button. In some examples, the sensing circuits 232 perform redundant sensing of the button position and generate redundant signals.

The button state module 226 receives outputs of the sensing circuits 232-1, 232-2, 232-3, . . . , and 232-N and determines whether any of the range selection buttons 220-1, 220-2, 220-3, . . . , and 220-N are actuated. In other words, the button state module 226 interprets one or more signals received from each of the sensing circuits 232 and outputs state signals to the control module making the range selection decision (which, in this example, is a range selection module 208 in the ECM 204). The state signals may identify at least one of the actuated, not activated or fault states for each of the range selection buttons 220. The button state module 226 may be connected by a bus to the ECM 204, the TCM 205 or another control module.

The park selection button 224 is connected to a sensing circuit 234, which generates one or more signals based on a position of the park button. The outputs of the sensing circuit 234 are output to the control module making the range selection decision (which is the ECM 204 in this example).

After making the range selection decision, the ECM 204 may output a range selection signal to the TCM 205. The ECM 204, the TCM 205 or another controller may output indicator signals to identify a selected range to an indicator display. The indicator 250 may include a single display panel or individual lights 260-1, 260-2, . . . , and 260-1 corresponding to park, reverse, neutral, drive or manual range modes, where T is an integer greater than one.

Figure 2B:
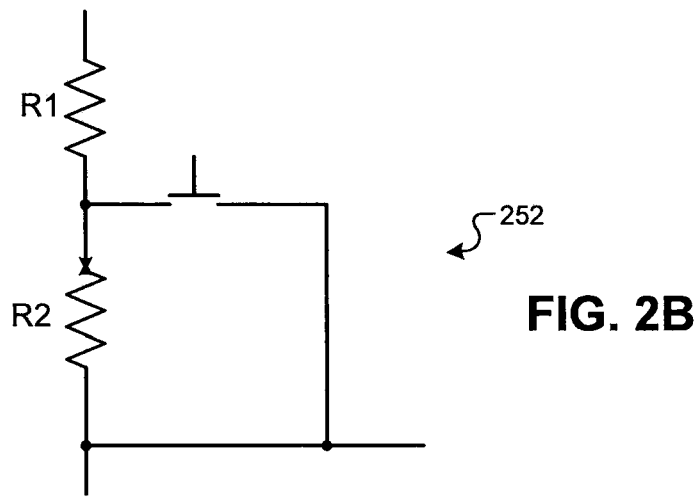
FIGS. 2B-2D are electrical schematics of button sensing circuits according to the present disclosure.
Figure 2C:
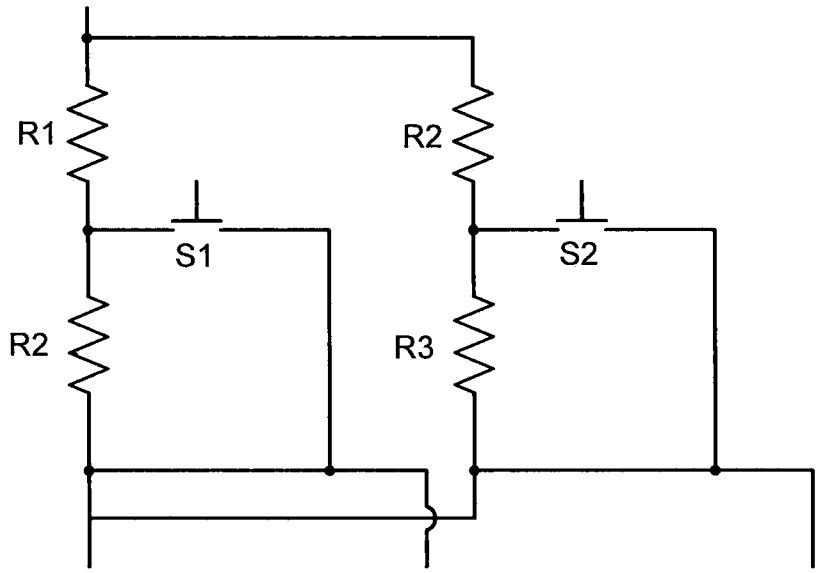
Figure 2D:
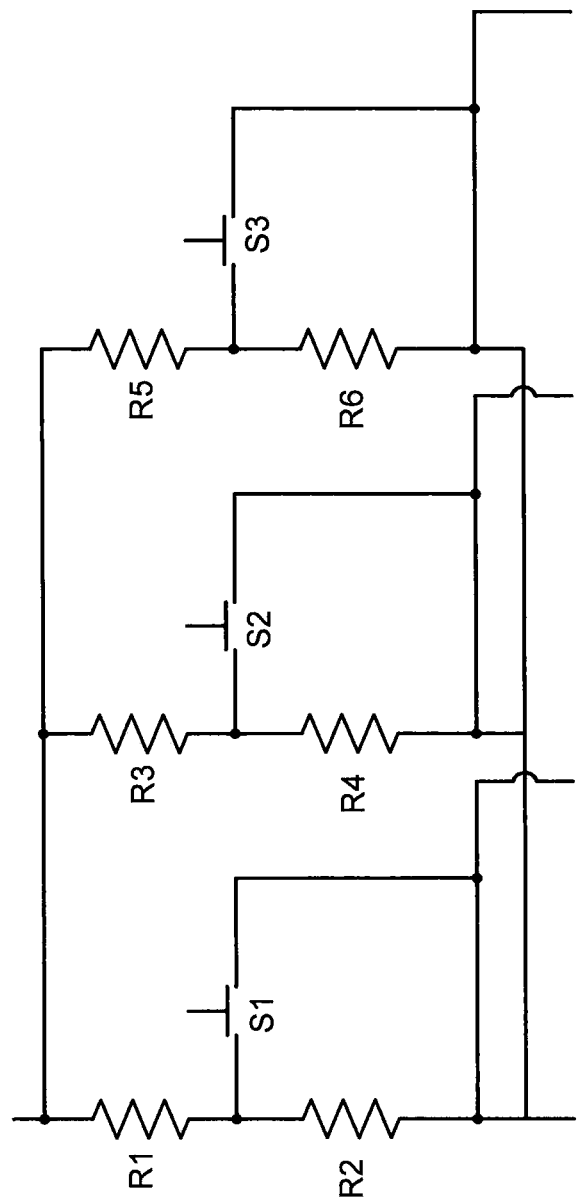

The sensing circuits 232 and 234 may have any suitable design. While examples are shown in FIGS. 2B-2D, other suitable types of sensing circuits may be used. In the example in FIG. 2B, first and second resistors R1 and R2 are connected in series. One end of resistor R1 is connected to a supply reference Ref1 and one end of resistor R2 is connected to a second reference Ref2. The corresponding range button selectively actuates a switch S1 that has one terminal connected between resistors R1 and R2. The output Out1 is taken between the resistor R2 and the second reference Ref2.

In FIGS. 2C and 2D, additional redundancy can be added by adding additional switches such as S2 or S2 and S3, respectively, and additional resistors such as R3 and R4 or R3, R4, R5, and R6, respectively. In some examples, all of the sensing circuits have the configuration shown in FIG. 3. As can be appreciated, additional switches and sub-sensing circuits can be used.

Figure 3:
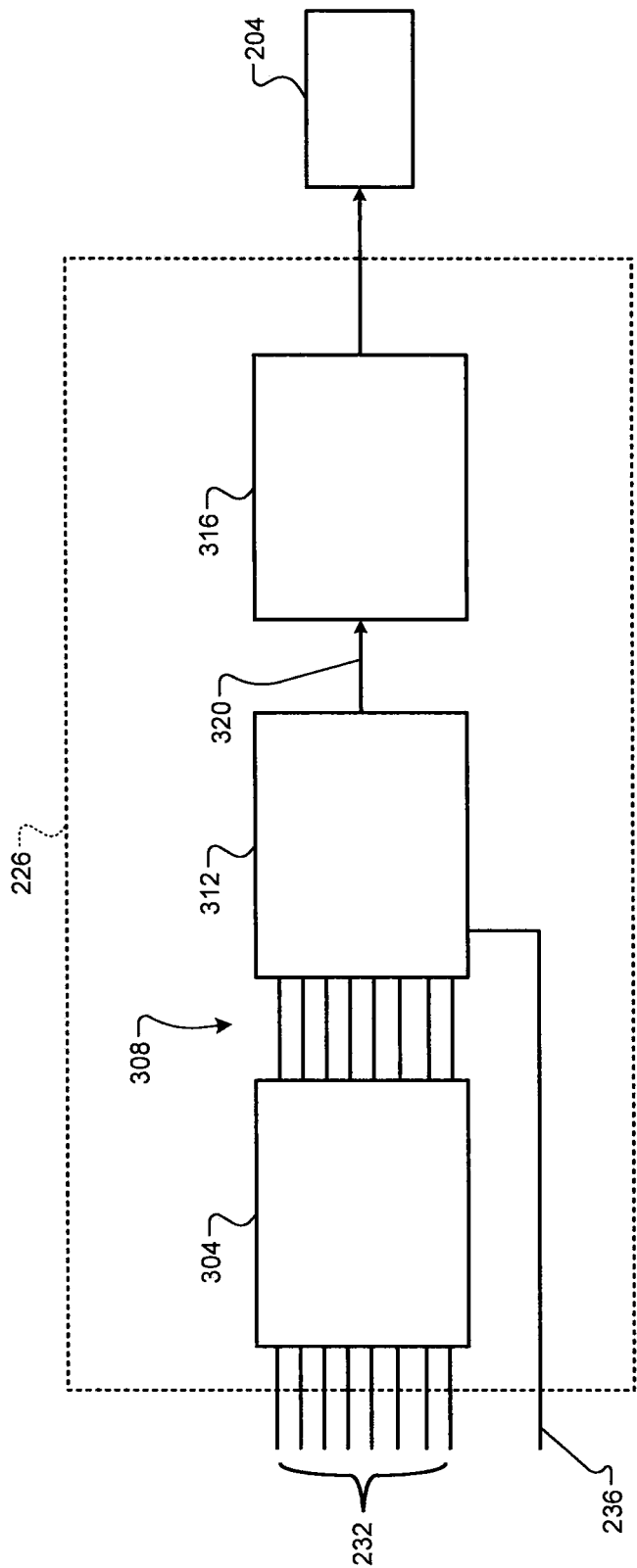
FIG. 3 is a functional block diagram of an example of a button interpretation module according to the present disclosure.

FIG. 3 includes a functional block diagram of an example implementation of the button state module 226. Referring now to FIGS. 2A and 3, the button state module 226 may include an analog to digital converter (ADC) module 304 that samples signals from the sensing circuits 232 at a predetermined sampling rate and that converts the samples into digital values 308. The button state module 226 determines a state of the switches in each of the sensing circuits 232 based on the digital values. The button state module 226 may also include a state selecting module that selects the states and encoding module (both shown at 312) that encodes the state output signal. A transceiver 316 outputs the state output signal to the ECM 204.

The state selecting and encoding module 312 selects states for the switches in each of the sensing circuits 232, performs optional encoding and generates a state output signal 320. The ECM 204, the TCM 205 or another control module receives the state output signal 320 and identifies one of the buttons as being actuated, none of the buttons being actuated or a fault condition. As can be appreciated, when the sensing circuits 232 include multiple sub-circuits as in FIG. 2D, the state selecting and encoding module 312 may determine that a button is actuated when not all of the sensing circuits 232 have the same output. In other words, when the sub-sensing circuit includes three switches, 2 out of 3 criteria may be used to determine that the switch is or is not actuated. A fault condition may be declared when more than one sub-sensing circuit detects an actuated button, or when inconsistent results are identified (for example, 2 sensing circuits are used and 1 sensing circuit indicates the button is actuated and another sensing circuit indicates the button is not). The state selecting and encoding module 312 also optionally encodes and/or formats the state output signal 320.

The transceiver module 316 transmits the state output signal 320 to the ECM 204, for example, using a CAN data protocol, a LIN data protocol, or another suitable serial data communication protocol. When encoding is performed, the ECM 204 decodes the first range selection signal 320.

The range determination module 208 associated with the ECM 204, TCM 205 or other control module receives the output 320 and other signals directly from the sensing circuit 234 associated with the park button 224.

Figure 4:
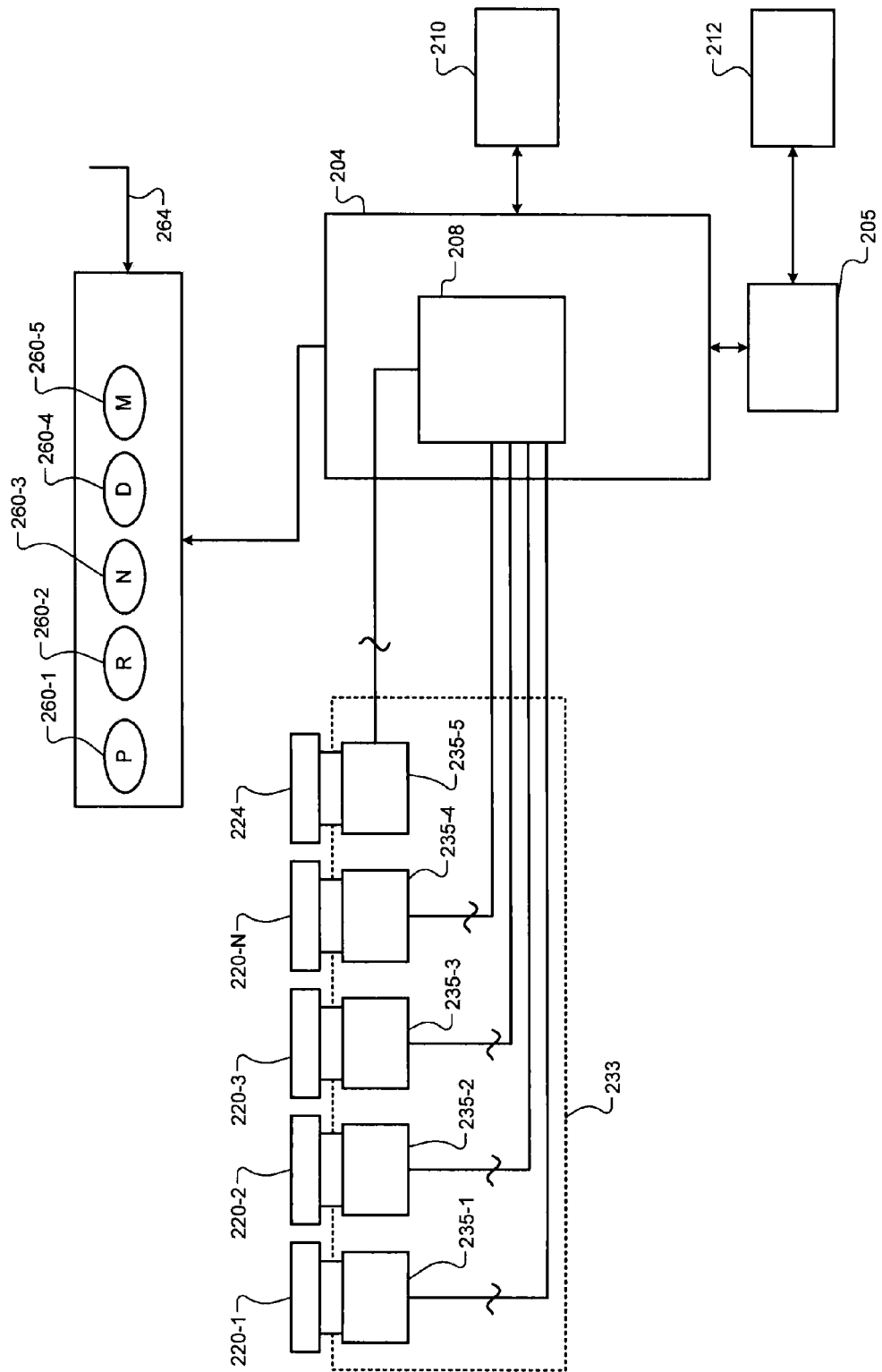
FIG. 4 is a functional block diagram of another example of an electronic transmission range selection system according to the present disclosure.

Referring now to FIG. 4, the button state module 226 can be omitted and outputs of sensing circuits 235-1, 235-2, . . . and 235-5 of range sensing module 233 can be input directly to a range determination module 209 of the ECM 204 (or other control module handling the range determination).

Figure 5:
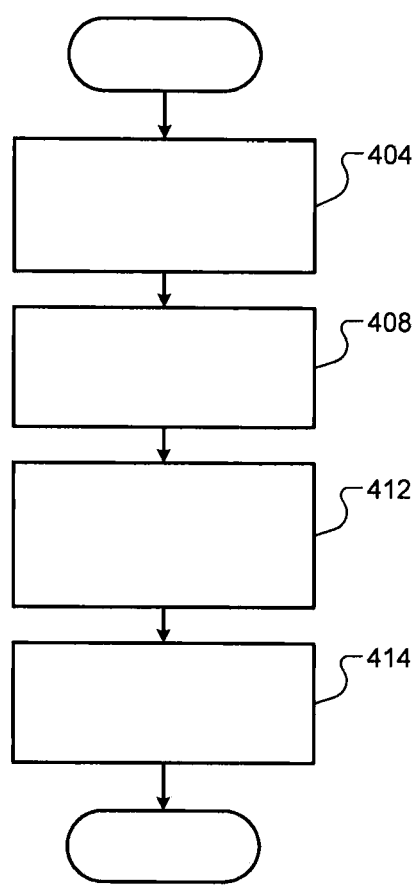
FIG. 5 is a flowchart depicting an example of a method for generating a range request according to the present disclosure.

Referring now to FIG. 5, a flowchart depicting an example method of generating a range request is presented. Control begins with 404 where the range sensing module 202 generates the state output signal and outputs the state output signal to the ECM 204, TCM 205 or other control module. At 408, the sensing circuit associated with the park button generates signals related to a position of the park button. At 412, the ECM 204, TCM 205 or other control module determines a range request based on the state output signal and the signals associated with the park button. At 416, the ECM 204, TCM 205 and/or other control module controls the transmission and display indicators based on the selected range.

Figure 6:
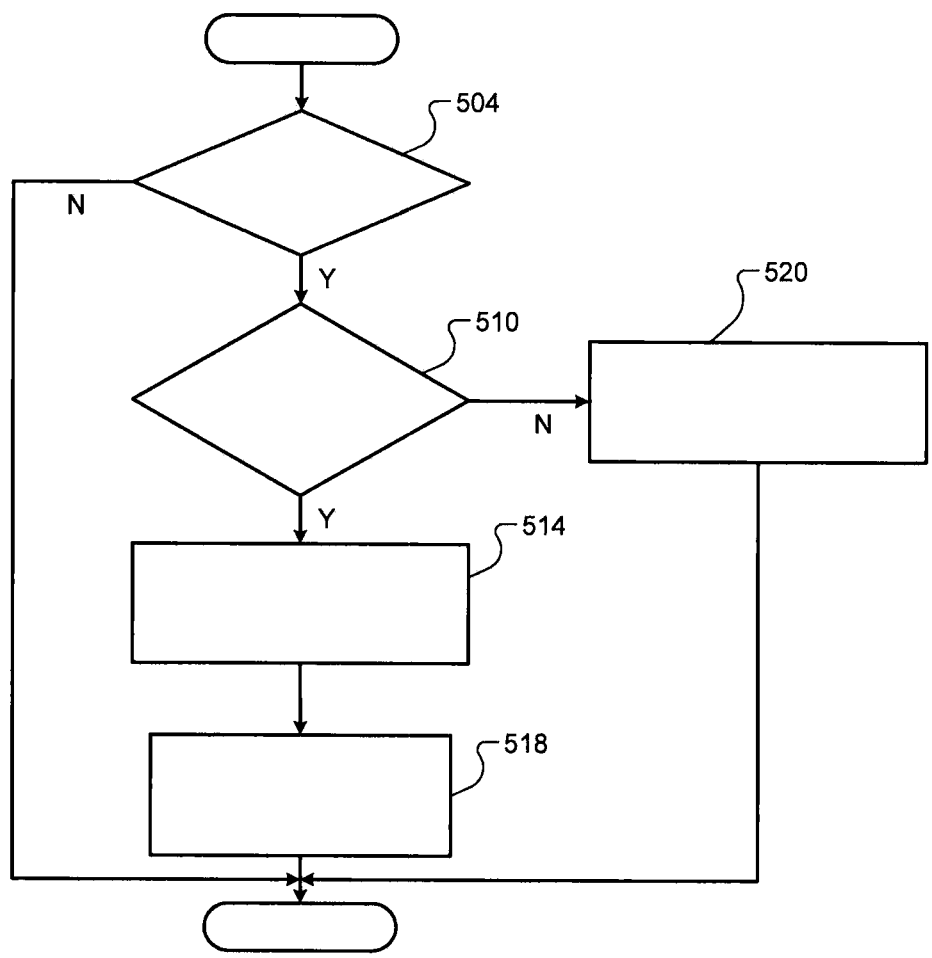
FIG. 6 is a flowchart depicting an example of a method for generating a range selection when conflicting range selection inputs are received according to the present disclosure.

Referring now to FIG. 6, an example of a method for generating a range selection when conflicting range selection inputs are received is shown. The method may be implemented by the range selection module 208 or another module. At 504, control determines whether there is a park button fault. A park button fault may occur when the sense signals generated by the park sensing circuit are invalid or not consistent. For example only, where three sub-sensing circuits are used to sense the park sensor, if one or two of the sense signals from the sub-sensing circuits do not agree with the other two or one of the sense signals, respectively, or if all (or one or more) of the sense signals are invalid values, then a park fault may occur.

If 504 is true, control continues with 510 and determines whether or not another range selection button is actuated. If 510 is true, control selects the other range corresponding to the other range selection button at 514 and control controls the transmission and indicators based on the other range selection button. If 510 is false, then park may be selected by default at 520 in the absence of selection of another range selection button.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system for selecting a transmission range in a vehicle, comprising:
   a plurality of range selection buttons configured to individually select corresponding ones of a plurality of ranges;
   a plurality of sensing circuits configured to generate sense signals based on positions of corresponding ones of the plurality of range selection buttons;
   a park range selection button configured to select a park range;
   a park sensing circuit configured to generate sense signals based on a position of the park range selection button;
   a button state module configured to output state signals corresponding to the plurality of range selection buttons based on the sense signals from the plurality of sensing circuits; and
   a control module configured to select a range based on the sense signals from the park sensing circuit and the state signals from the button state module,
   wherein the control module selectively identifies a park button fault based on the sense signals from the park sensing circuit and sets the transmission range to a park range when the park button fault occurs and none of the plurality of range selection buttons are activated.

2. The system of claim 1, wherein the control module corresponds to an engine control module for an engine of the vehicle.

3. The system of claim 1, wherein the control module corresponds to a transmission control module for a transmission of the vehicle.

4. The system of claim 1, wherein each of the plurality of sensing circuits senses the position of the corresponding one of the plurality of range selection buttons multiple times and generates multiple sense signals for each of the plurality of range selection buttons.

5. The system of claim 1, wherein the plurality of range selection buttons include a drive range selection button, a neutral range selection button, a reverse range selection button and manual range selection button.

6. The system of claim 1, wherein the control module selectively sets the transmission range to a selected one of the plurality of ranges when the park button fault occurs and the selected one of the plurality of range selection buttons is activated.

7. A method for selecting a transmission range in a vehicle, comprising:
individually selecting corresponding ones of a plurality of ranges using a plurality of range selection buttons;
generating sense signals based on positions of corresponding ones of the plurality of range selection buttons;
selecting a park range using a park range selection button;
generating park sense signals based on a position of the park range selection button;
generating state signals corresponding to the plurality of range selection buttons based on the sense signals;
selecting a transmission range based on the park sense signals and the state signals corresponding to the plurality of range selection buttons;
selectively identifying a park button fault based on the sense signals from the park sensing circuit; and
setting the transmission range to a park range when the park button fault occurs and none of the plurality of range selection buttons are activated.

8. The method of claim 7, wherein the selecting the transmission range is performed in an engine control module for an engine of the vehicle.

9. The method of claim 7, wherein the selecting the transmission range is performed in a transmission control module for a transmission of the vehicle.

10. The method of claim 7, further comprising sensing the position of the corresponding one of the plurality of range selection buttons multiple times and generates multiple sense signals for each of the plurality of range selection buttons.

11. The method of claim 7, wherein the plurality of range selection buttons include a drive range selection button, a neutral range selection button, and manual range selection button.

12. The method of claim 7, further comprising:
setting the transmission range to a selected one of the plurality of ranges when the park button fault occurs and the selected one of the plurality of range selection buttons is activated.

13. A system for selecting a transmission range in a vehicle, comprising:
a plurality of range selection buttons configured to individually select corresponding ones of a plurality of ranges;
a plurality of sensing circuits configured to generate sense signals based on positions of corresponding ones of the plurality of range selection buttons;
a park range selection button configured to select a park range;
a park sensing circuit configured to generate sense signals based on a position of the park range selection button; and
a control module configured to select a range based on the sense signals from the park sensing circuit and the plurality of sensing circuits,
wherein the control module selectively identifies a park button fault based on the sense signals from the park sensing circuit and sets the transmission range to a park range when the park button fault occurs and none of the plurality of range selection buttons are activated.

14. The system of claim 13, wherein the control module corresponds to one of:
an engine control module for an engine of the vehicle; or
a transmission control module for a transmission of the vehicle.

15. The system of claim 13, wherein each of the plurality of sensing circuits senses the position of the corresponding one of the plurality of range selection buttons multiple times and generates multiple sense signals for each of the plurality of range selection buttons.

16. The system of claim 13, wherein the plurality of range selection buttons include a drive range selection button, a neutral range selection button, a reverse range selection button and manual range selection button.

17. The system of claim 13, wherein the control module selectively sets the transmission range to a selected one of the plurality of ranges when the park button fault occurs and the selected one of the plurality of range selection buttons is activated.

18. A system for selecting a transmission range in a vehicle, comprising:
a plurality of range selection buttons configured to individually select corresponding ones of a plurality of ranges;
a plurality of sensing circuits configured to generate sense signals based on positions of corresponding ones of the plurality of range selection buttons;
a park range selection button configured to select a park range;
a park sensing circuit configured to generate sense signals based on a position of the park range selection button;
a button state module configured to output state signals corresponding to the plurality of range selection buttons based on the sense signals from the plurality of sensing circuits; and
a control module configured to select a range based on the sense signals from the park sensing circuit and the state signals from the button state module,
wherein the control module selectively identifies a park button fault based on the sense signals from the park sensing circuit and sets the transmission range to a selected one of the plurality of ranges when the park button fault occurs and the selected one of the plurality of range selection buttons is activated.

19. A method for selecting a transmission range in a vehicle, comprising:
individually selecting corresponding ones of a plurality of ranges using a plurality of range selection buttons;
generating sense signals based on positions of corresponding ones of the plurality of range selection buttons;
selecting a park range using a park range selection button;
generating park sense signals based on a position of the park range selection button;
generating state signals corresponding to the plurality of range selection buttons based on the sense signals;

selecting a transmission range based on the park sense signals and the state signals corresponding to the plurality of range selection buttons;
selectively identifying a park button fault based on the sense signals from the park sensing circuit; and
setting the transmission range to a selected one of the plurality of ranges when the park button fault occurs and the selected one of the plurality of range selection buttons is activated.

* * * * *